May 3, 1966  V. J. RUSSO  3,249,657
METHOD AND MEANS FOR PRILLING
Filed June 3, 1964

INVENTOR.
VINCENT J. RUSSO,
BY Yungblut, Melville,
Strasser + Foster,

ATTORNEYS.

United States Patent Office 3,249,657
Patented May 3, 1966

3,249,657
METHOD AND MEANS FOR PRILLING
Vincent J. Russo, Cincinnati, Ohio, assignor to The Chemical and Industrial Corp., Cincinnati, Ohio, a corporation of Ohio
Filed June 3, 1964, Ser. No. 372,238
8 Claims. (Cl. 264—8)

Various chemical substances and some food materials are desired in the form of small prills or pellets. This is especially true of fertilizer substances, where a prilled form facilitates bagging, handling, shipping and storage, and finally the spreading of the fertilizer substances on the earth by means of common farm machinery. Many fertilizer substances may be prilled including, but without limitation, ammonium nitrate and mixtures of ammonium nitrate and finely divided substances such as limestone and phosphate. In general, substances are suitable for prilling when they can be melted at elevated temperatures but without substantial decomposition. A water content may exist in the substances wihout departing from the spirit of the invention; but prilling should be distinguished from spray drying. Spray drying generally results in the production of low density pellets which are both fragile and porous. As a consequence, it is preferred to prill substantially anhydrous substances; and if water is present at the time the prills are formed, it is preferred so small in amount that the prills will harden and become solid upon cooling to near room temperature. If sufficient water is present so that the prills, while solid, are nevertheless somewhat tacky, an after-drying as in a rotating drum may be practiced.

For the sake of a specific exemplary showing the process and apparatus will be described in connection with the prilling of a fertilizer substance consisting of a mixture of wax and urea. The mixture becomes molten when the wax liquifies, but at a temperature below that which would be required to melt the finely divided urea contained in the wax.

Most prilling has been accomplished in the past by causing the molten product to pass through holes in an orifice plate, whereby the product is formed into droplets. The orifice plate is located at the top of a tower through which the droplets fall in a column of rising cooling gas, generally air. The tower will have to be tall enough to permit the necessary cooling. Difficulties are encountered in this type of prilling, particularly in the matters of uniformity of droplet size and the tendency for the holes in the orifiice plate to become clogged.

It has hitherto been suggested that droplets might be formed by depositing the molten material onto a rotating plate near the top of the tower, so that the material would be thrown laterally from the plate by centrifugal force. However, difficulties have been encountered with a stringing of the material, and it has not been found possible to exercise effective control over the size of the droplets where droplets are produced.

It is a principal object of this invention to provide a method and apparatus for prilling which results in the positive production of droplets and in which the size of the droplets can be very exactly controlled.

It is an object of the invention to provide a simple mechanism for prilling which can be inexpensively constructed, and while it has a rotating element, employs a speed low enough so that the balancing of the rotating element is not a critical factor.

It is an object of the invention to provide a prilling means requiring a lesser air velocity and a shorter tower, resulting in a lower capital investment.

It is an object of the invention to provide a mechanism and procedure in which unavoidable changes in the viscosity of the molten material or slurry, in the temperature of the material, and in the particle sizes of a substance suspended in a molten carrier do not seriously affect the operation.

These and other objects of the invention which will be set forth hereinafter or will be apparent to one skilled in the art upon reading these specifications are accomplished by that procedure and in that construction and arrangement of parts of which an exemplary embodiment will now be described.

Briefly, in the practice of the invention, use is made of a rotating element hereinafter termed a "spinning basket." The spinning basket is either a cylindrical or downwardly tapering conical element having a solid metal disc for a bottom, being open at the top and having side walls which are formed in part at least of wire cloth. A central shaft is attached to the disc base and is arranged to rotate at a rate usually between about 15 and about 200 r.p.m. The rate of rotation depends in part upon the effective diameter of the basket, but may be changed for adjustment purposes. The slurry or molten material to be prilled is fed at an appropriate rate into the spinning basket, either through the open top thereof or through the shaft aforesaid, which may be made hollow for the purpose. The material will be in molten condition and will be showered outwardly from the spinning basket. Surprisingly the action of the wire cloth will be to form droplets of great uniformity; and the effect of any temporary clogging of the surface of the wire cloth does not substantially vary the size of the droplets produced.

The cooling tower employed may be a conventional prilling tower; but the diameter of the tower should be related to the diameter of the spinning basket in view of the lateral showering of the prilling material. The minimum diameter of the tower should be at least about seven feet plus the diameter of the spinning basket. The air velocity in the tower may be reduced to that necessary to remove the heat from the droplets and freeze them into prills.

Figure 1:
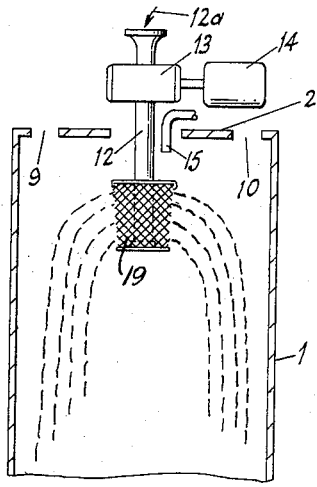
FIG. 1 is a vertical cross sectional view of semi-diagrammatic character of a prilling mechanism in accordance with the invention.

Referring first to FIG. 1, a prilling tower is indicated at 1, having a top 2, and a bottom 3. The bottom portion of the tower is preferably a downwardly dished annulus having a central opening at 4 connecting with a discharge port element 5. Above the bottom 3 there is a conical gas-pervious structure 6, later described at greater length. The outer edges of this conical structure join the cylindrical walls of the tower along a line spaced from the dished bottom element 3, but the conical element joins the bottom of the tower around the edge of the discharge opening 4, the conical element being also open at this position to permit discharge of the prills through the spout 5.

Cooling air or other gas from a blower 7 is introduced through a conduit 8 to the space between the conical element 6 and the tower bottom 3. Thus the cooling gas fills the space between the conical element 6 and the tower bottom 3, essentially entering the body of the tower through the foraminous element 6 and acting to prevent the sticking of prills thereto. The prills roll down the sloping surfaces of the element 6 and are withdrawn from the tower at the opening 4. The spout 5 may be provided with a flap valve (not shown) acting to prevent exit of the cooling gases.

The cooling gases pass upwardly through the tower and exit through openings 9 and 10 in the top thereof. A cylindrical spinning basket is shown at 11 suspended within the top of the tower on a vertical shaft 12. This shaft descends from a preferably adjustable speed-reducer 13 which is driven by an electric motor 14 or other prime mover. The molten material or slurry may be introduced into the spinning basket through a spout 15 or, if the shaft 12 is hollow, through the shaft itself which is prolonged upwardly for the purpose as at 12a. In either event the slurry will come from a suitable supply or head tank (not shown) in which it is maintained in proper condition for prilling by heating and agitating means. The side portions of the spinning basket are made of wire cloth; and the droplets are showered centrifugally outward, curving in their trajectory until they fall vertically through the tower as is indicated in dotted lines in FIG. 1.

Figure 3:
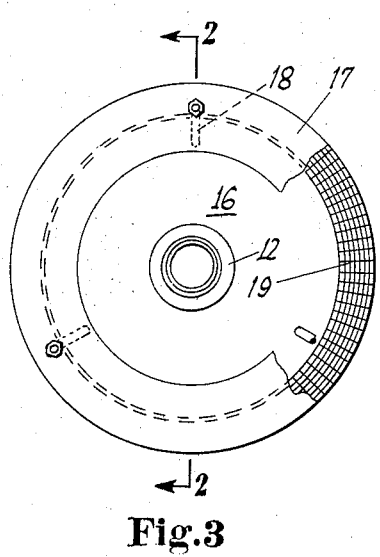
FIG. 3 is a plan view thereof.
Figure 2:
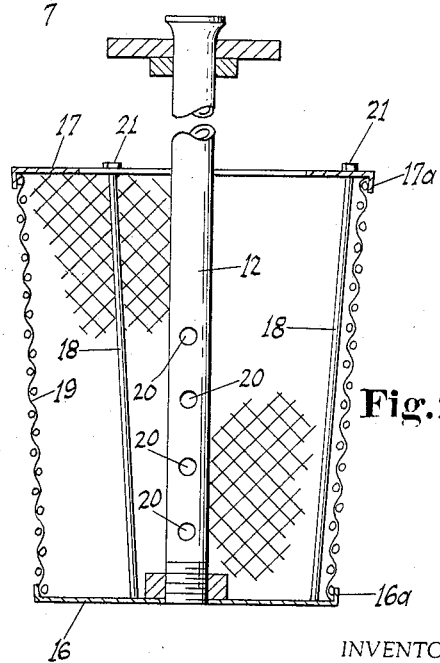
FIG. 2 is a vertical section of a prilling basket forming part of the apparatus.

A preferable form of spinning basket is illustrated in FIGS. 2 and 3. It comprises a relatively thin bottom plate 16 of metal, preferably. It is provided with an upturned lip 16a. The shaft 12 is attached centrally to the bottom plate or disc 16.

There is a relatively thin and preferably annular top plate 17 with a downturned lip 17a. The top and bottom plates may be attached to each other in spaced condition by means of a plurality of rod elements, two of which are shown at 18. The side wall element 19 is formed of wire cloth preferably in the shape of an inverted truncated cone as indicated in the drawing. Where the shaft 12 is hollow and is used for feeding material to the basket, it will be provided with a plurality of holes 20 for the purpose. The rod elements 18 may be attached by welding, riveting, or in any other way desired to the bottom disc 16; but they are preferably threaded and provided at the top with nuts 21 so that the basket may be disassembled for renewal of the wire cloth.

Dimensions do not constitute a limitation on this invention. Where a spinning basket as illustrated in FIGS. 2 and 3 is made with an overall height of 6½ inches and an extreme diameter of about 5¼ inches, it will be found, however, that it will handle and prill about five hundred pounds of slurry per hour. Other dimensions may be adopted where different capacities are desired.

Figure 4:
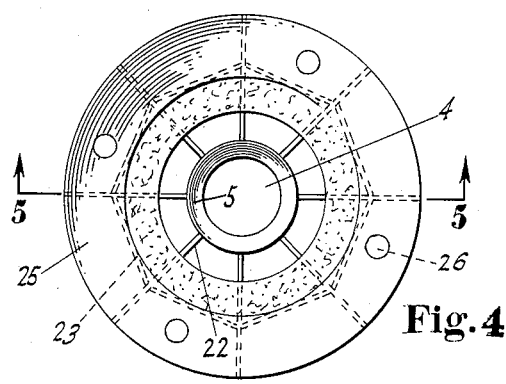
FIG. 4 is a plan view of the bottom portion of the prilling tower.
Figure 5:
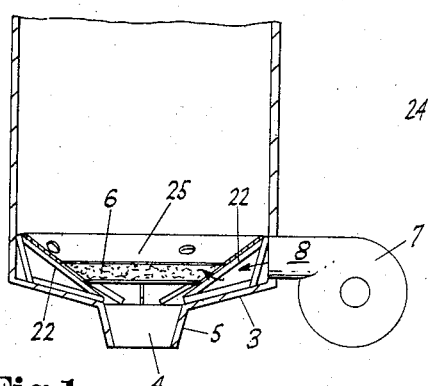
FIG. 5 is a side elevation of the same portion.
Figure 5:
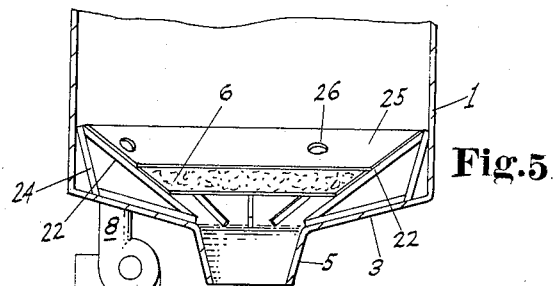

As shown in FIGS. 4 and 5, the conical element 6 in the bottom of the tower may comprise a plurality of radial and slantwise disposed supporting means 22 defining the conical shape. These means may have cross braces 23 and lower bracing means 24 if desired. The elements 22 may be covered either with wire cloth of a mesh size such as will retain the pellets or they may be covered with wool felt of gas-pervious character. It is also possible to cover a portion of the elements 22 with a sheet metal annulus 25 and to provide a series of openings 26 in the annulus for the passage of the cooling gases. In any event, the gases will enter the tower through the conical element 26.

Initial tests were made in working out the present invention, with a spinning basket three inches in diameter and one inch in height, the side portions of which were made of twenty mesh wire cloth. Without using a tower, and by showering the material into the atmosphere, prills were obtained, surprisingly, in a free fall of less than three feet. This was most unusual when compared with a prilling plate operation requiring a twenty foot free fall with a minimum air velocity of 275 feet per minute. It was found possible to vary the size of the particles by changing the rotative speed of the spinning basket from 58 r.p.m. to 200 r.p.m. Subsequently it was found that very substantial changes in the particle size range of the prills could be made by changing the mesh size and wire diameter of the screen cloth used to make the basket.

For different purposes prills of different sizes may be desired. As a consequence, it is not possible to state size limitations for the openings in the wire cloth used, but good prilling operations can be achieved with wire cloths ranging from eleven to twenty or more meshes per lineal inch, where the diameter of the wires range from .054 inch to .041 inch and the width in the openings in the screen varied from .0369 inch to .0215 inch or less. In the prilling of the particular urea wax slurry which consisted of 60% urea in finely divided condition suspended in 40% wax having a melting point of between 135° and 145° F., it was desired to make prills which would pass through a ten mesh screen but would be retained on a twenty mesh screen. For this purpose the screen cloth chosen for the spinning basket had twenty meshes to the linear inch and was made of wire having a diameter of .023 inch. It was found that the process was capable of producing about one ton per hour per 100 square inches of wire cloth surface.

A further surprising feature of the method and apparatus lay in the narrow range of prill sizes produced. In a prilling plate operation carried on under optimum conditions, while 87% of the prills passed through a six mesh screen but were retained on a twenty mesh screen, only 30% of the product would pass through a ten mesh screen but would be retained on a twenty mesh screen. In the use of the apparatus and the practice of the process of this invention, it was found that 87% of the product would pass through a ten mesh screen but would be retained on a twenty mesh screen.

It was found that the quality of the slurry, its viscosity, and its melting temperature had little effect on the quality of the prills. Conditions for optimum operation have been indicated above. The amount of cooling gas used can be only that required to solidify the droplets, but will vary with the temperature of the droplets and the total quantity of material passing through the wire cloth of the spinning basket. The distance to which the droplets are showered outwardly will vary with viscosity, temperature, and the speed of rotation of the spinning basket, but only the last mentioned of these factors has an important effect on the size of the prills being formed. It is an advantage of the process of this invention that very highly uniform prills may be made in relatively inexpensive apparatus with a large throughput.

The embodiments of the invention in which an exclusive property or privilege is claimed are defined as follows:

1. A process of prilling which includes forming a molten prilling substance into droplets by forcing said substance outwardly by centrifugal force through the side wall of a rotating basket, which side wall is formed of wire cloth, controlling the size range of the droplets within predetermined limits by selecting a mesh size for said wire cloth between about 11 and about 20 meshes per linear inch and by varying the rotational speed of said basket about 60 and about 200 r.p.m., and allowing the droplets so formed to fall downwardly through countercurrent cooling gases in a tower having a diameter of from 7 feet to 25 feet and a free fall of from 15 feet to 60 feet, whereby to obtain solidified prills more than 87% of which are within the range of −10+20 mesh size.

2. The process claimed in claim 1 wherein the molten prilling substance is introduced into the said basket through an open top portion thereof.

3. The process claimed in claim 1 wherein the molten prilling substance is introduced into said basket through a hollow shaft acting to rotate said basket.

4. The process claimed in claim 3 wherein the material being prilled is a mixture of about 40% wax and about 60% finely divided urea.

5. In apparatus for prilling a molten substance, comprising means for introducing molten substance into a spinning basket, a tower in which droplets of the molten substance discharge from said basket fall freely and solidify, means in connection with said tower to produce an upwardly rising column of cooling gases, and means at the bottom of said tower to collect the solidified prills, the improvement which comprises a spinning basket having a relatively thin imperforate base with a diameter of substantially 3 to 6 inches and a side wall element formed at least in part of wire cloth attached peripherally to said base, said wire cloth having a mesh size between about 11 and about 20 meshes per linear inch, a shaft attached to the center portion of said base by means of which said basket is suspended and rotated, and adjustable means for driving said shaft at a variable speed between about 60 and about 200 r.p.m.

6. The structure claimed in claim 5 in which the wire cloth element has a downwardly tapering conical shape.

7. The structure of claim 5 in which said tower has a diameter of at least about 7 feet plus the diameter of the spinning basket, and means in connection with said tower to produce an upwardly rising column of cooling gas therein at a flow rate of at least substantially 25,000 c.f.m.

8. The structure claimed in claim 7 in which the tower has a bottom with a centrally disposed discharge opening therein, and in which above the bottom there is an annular gas-pervious conical element attached peripherally to said opening and attached peripherally to said tower at a higher level, the said means for introducing cooling gas into said tower being so located as to introduce it beneath the said conical element whereby the cooling gas passes first through said pervious conical element before entering the main body of said tower.

References Cited by the Examiner

UNITED STATES PATENTS

| | | | |
|---|---|---|---|
| 773,614 | 11/1904 | Westaway | 264—8 |
| 1,348,140 | 7/1920 | Howell | 264—8 |
| 1,352,623 | 9/1920 | Perry | 18—2.6 X |
| 1,581,664 | 4/1926 | Schwantes | 18—2.6 |
| 1,785,532 | 12/1930 | Schwantes | 18—2.6 |
| 2,919,184 | 12/1959 | Oswald et al. | |
| 2,921,335 | 1/1960 | Bowers et al. | 18—2.7 |
| 3,055,049 | 9/1962 | De Bruyne et al. | 18—2.6 |
| 3,083,406 | 4/1963 | Hoogendonk | 18—2.6 |
| 3,120,026 | 2/1964 | Russel et al. | 18—2.6 |

WILLIAM J. STEPHENSON, *Primary Examiner.*

ROBERT F. WHITE, *Examiner.*

F. S. WHISENHUNT, *Assistant Examiner.*